(12) United States Patent
Liao

(10) Patent No.: US 12,202,573 B2
(45) Date of Patent: Jan. 21, 2025

(54) BICYCLE REAR DERAILLEUR

(71) Applicant: TEKTRO TECHNOLOGY CORPORATION, Sioushuei Township, Changhua County (TW)

(72) Inventor: Bo-Yi Liao, Sioushuei Township, Changhua County (TW)

(73) Assignee: TEKTRO TECHNOLOGY CORPORATION, Sioushuei Township (TW)

( * ) Notice: Subject to any disclaimer, the term of this patent is extended or adjusted under 35 U.S.C. 154(b) by 0 days.

(21) Appl. No.: 18/392,879

(22) Filed: Dec. 21, 2023

(65) Prior Publication Data

US 2024/0217620 A1 Jul. 4, 2024

(30) Foreign Application Priority Data

Dec. 28, 2022 (TW) .................................. 111150269

(51) Int. Cl.
*B62M 9/1242* (2010.01)
*B62M 9/125* (2010.01)
*B62M 9/126* (2010.01)
*B62M 25/08* (2006.01)

(52) U.S. Cl.
CPC .......... *B62M 9/1242* (2013.01); *B62M 9/125* (2013.01); *B62M 25/08* (2013.01); *B62M 9/126* (2013.01)

(58) Field of Classification Search
CPC .. B62M 9/1242; B62M 9/1342; B62M 25/08; B62M 9/122; B62M 9/125

USPC .......................................................... 474/82
See application file for complete search history.

(56) References Cited

U.S. PATENT DOCUMENTS

| | | | | |
|---|---|---|---|---|
| 6,997,835 B2* | 2/2006 | Fukuda | ................ | B62M 9/1242 474/82 |
| 7,942,768 B2* | 5/2011 | Takamoto | .............. | B62M 9/122 474/82 |
| 8,066,597 B2* | 11/2011 | Sakaue | ................. | B62M 9/122 474/82 |
| 8,974,331 B2* | 3/2015 | Yamaguchi | ............... | F16H 9/06 474/82 |
| 9,005,059 B2* | 4/2015 | Suyama | ................ | B62M 9/122 474/82 |
| 9,303,763 B2* | 4/2016 | Yamaguchi | ............ | B62M 9/122 |
| 10,442,498 B2* | 10/2019 | Pasqua | ................. | B62M 9/1342 |
| 11,230,349 B2* | 1/2022 | Liao | ...................... | B62M 9/132 |

(Continued)

*Primary Examiner* — Henry Y Liu
(74) *Attorney, Agent, or Firm* — NIXON PEABODY LLP

(57) ABSTRACT

A bicycle rear derailleur includes a base component, a movable component, a linkage assembly, a chain guide, a driving assembly and a clutch mechanism. The linkage assembly includes a first link and a second link. Two opposite sides of the first link are connected to the base component and the movable component via a first shaft and a second shaft. Two opposite sides of the second link are connected to the base component and the movable component via a third shaft and a fourth shaft. The chain guide is disposed on the movable component. The driving assembly is disposed on the first link and configured to drive the first shaft. The clutch mechanism is movably disposed at a position where the first shaft is connected to the base component. The clutch mechanism is configured to connect or disconnect a transmission relationship between the first shaft and the base component.

13 Claims, 10 Drawing Sheets

(56) References Cited

U.S. PATENT DOCUMENTS

| | | | | |
|---|---|---|---|---|
| 11,319,020 B2* | 5/2022 | Liao | B62M 9/125 |
| 11,440,622 B2* | 9/2022 | De Poli | B62M 25/08 |
| 11,472,509 B2* | 10/2022 | Sala | B62M 9/125 |
| 11,535,338 B2* | 12/2022 | Sala | G01D 5/145 |
| 11,840,315 B2* | 12/2023 | Hahn | B62M 9/126 |
| 11,866,127 B2* | 1/2024 | Boehm | B62M 9/125 |
| 12,017,731 B2* | 6/2024 | Shipman | B62M 9/122 |
| 12,024,263 B2* | 7/2024 | Minto | B62M 9/124 |
| 12,122,479 B2* | 10/2024 | Braedt | B62M 9/1248 |
| 2008/0227572 A1* | 9/2008 | Sakaue | B62M 9/122 474/82 |
| 2009/0191994 A1* | 7/2009 | Takamoto | B62M 9/122 474/70 |
| 2014/0087901 A1* | 3/2014 | Shipman | B62J 43/30 429/100 |
| 2014/0162817 A1* | 6/2014 | Yamaguchi | B62M 9/122 474/80 |
| 2015/0111675 A1* | 4/2015 | Shipman | B62M 9/122 474/82 |
| 2017/0320541 A1* | 11/2017 | Pasqua | B62M 9/1342 |
| 2019/0100279 A1* | 4/2019 | Brown | B62M 9/127 |
| 2019/0300112 A1* | 10/2019 | Liao | B62M 9/1242 |
| 2020/0339220 A1* | 10/2020 | Boehm | B62M 9/122 |
| 2020/0346714 A1* | 11/2020 | Hahn | B62M 9/122 |
| 2021/0129939 A1* | 5/2021 | Sala | B62M 9/128 |
| 2021/0387696 A1* | 12/2021 | Sala | B62M 9/122 |
| 2022/0411017 A1* | 12/2022 | Braedt | B62M 9/122 |
| 2023/0202609 A1* | 6/2023 | Hahn | B62J 45/40 701/29.1 |
| 2023/0365225 A1* | 11/2023 | Hamed | H02K 11/21 |
| 2023/0365226 A1* | 11/2023 | Minto | G01B 7/30 |

\* cited by examiner

BICYCLE REAR DERAILLEUR

CROSS-REFERENCE TO RELATED APPLICATIONS

This non-provisional application claims priority under 35 U.S.C. § 119(a) on Patent Application No(s). 111150269 filed in Taiwan, R.O.C. on Dec. 28, 2022, the entire contents of which are hereby incorporated by reference.

TECHNICAL FIELD

The disclosure relates to a rear derailleur, more particular to a bicycle rear derailleur.

BACKGROUND

In recent years, road bikes, mountain bikes and other types of bicycles are all popular in the market, and it motivates bicycle manufacturers to pay more attention on improving their products.

At present, a high-end bicycle derailleur is an electronic derailleur, and the power for the shift of the bicycle derailleur is provided by a motor, and a transmission gear set can transmit the power provided by the motor. However, when an external force (e.g., an impact) is suddenly exerted on the bicycle derailleur, the external force can easily result in damage to the transmission gear set and the motor, causing a malfunction of the bicycle derailleur. Therefore, how to solve the aforementioned issue is one of the crucial topics in this field.

SUMMARY

The disclosure provides a bicycle rear derailleur which can prevent damage from external forces, thus ensuring its normal operation.

One embodiment of the disclosure provides a bicycle rear derailleur. The bicycle rear derailleur is configured to be mounted on a bicycle frame. The bicycle rear derailleur includes a base component, a movable component, a first shaft, a second shaft, a third shaft, a fourth shaft, a linkage assembly, a chain guide, a driving assembly and a clutch mechanism. The base component is configured to be mounted on the bicycle frame. The linkage assembly includes a first link and a second link. Two opposite sides of the first link are pivotably connected to the base component and the movable component via the first shaft and the second shaft, respectively. Two opposite sides of the second link are pivotably connected to the base component and the movable component via the third shaft and the fourth shaft, respectively. The chain guide is pivotably disposed on the movable component. The driving assembly is disposed on the first link. The driving assembly is configured to drive the first shaft to rotate. The clutch mechanism is movably disposed at a position where the first shaft is connected to the base component. The clutch mechanism is configured to connect a transmission relationship between the first shaft and the base component or disconnect the transmission relationship between the first shaft and the base component.

Another embodiment of the disclosure provides a bicycle rear derailleur. The bicycle rear derailleur is configured to be mounted on a bicycle frame. The bicycle rear derailleur includes a base component, a movable component, a first shaft, a second shaft, a third shaft, a fourth shaft, a linkage assembly, a chain guide and a driving assembly. The base component is configured to be mounted on the bicycle frame. The linkage assembly includes a first link and a second link. Two opposite sides of the first link are pivotably connected to the base component and the movable component via the first shaft and the second shaft, respectively. Two opposite sides of the second link are pivotably connected to the base component and the movable component via the third shaft and the fourth shaft, respectively. The chain guide is pivotably disposed on the movable component. The driving assembly is disposed on the first link and includes a motor, a plurality of transmission gears, an output gear, a connection gear, an output shaft, a sensing component and a sensor. The motor is connected to the first shaft via the transmission gears, the output gear and the connection gear, sequentially, the output shaft is fixed to the output gear, the sensing component is disposed on the output shaft, and the sensor is configured to measure a rotation of the sensing component.

According to the bicycle rear derailleurs as discussed in the above embodiments, the clutch mechanism is movably disposed at a position where the first shaft is connected to the base component, and the clutch mechanism can connect or disconnect the transmission relationship between the first shaft and the base component, which can prevent the driving assembly from being damaged by the external force (e.g., an impact) exerted on the bicycle rear derailleur, thereby maintaining the normal operation of the bicycle rear derailleur.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

Figure 1:
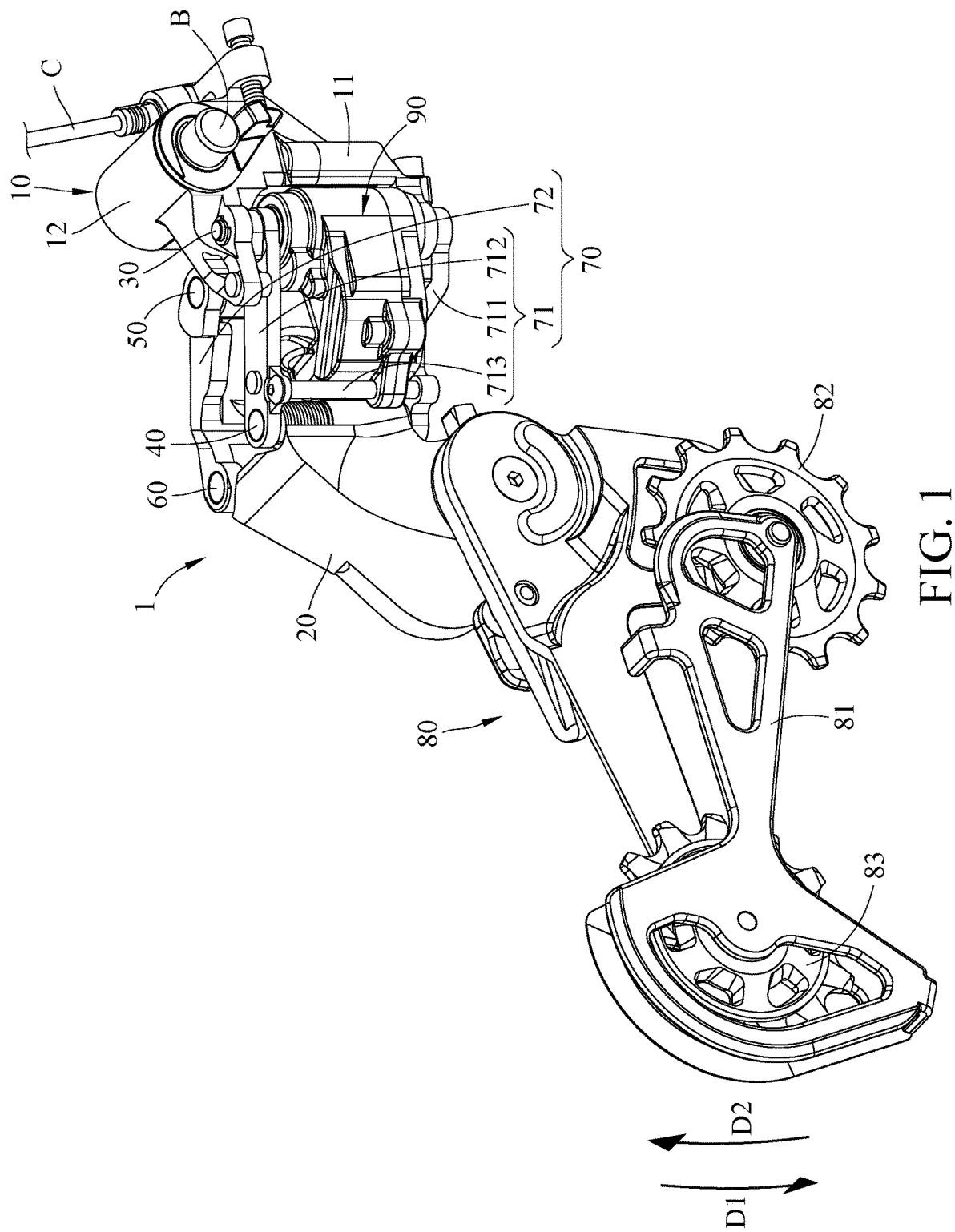
FIG. 1 is a perspective view of a bicycle rear derailleur according to a first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Referring to FIG. 1, FIG. 1 is a perspective view of a bicycle rear derailleur 1 according to a first embodiment of the disclosure.

In this embodiment, the bicycle rear derailleur 1 is configured to be mounted on a bicycle frame (not shown). The bicycle rear derailleur 1 includes a base component 10, a movable component 20, a first shaft 30, a second shaft 40, a third shaft 50 and a fourth shaft 60, a linkage assembly 70, a chain guide 80, a driving assembly 90 and a clutch mechanism 120.

The base component 10 includes a first casing 11 and a second casing 12 assembled with each other. The second casing 12 is configured to be mounted on the bicycle frame via a bolt B. The linkage assembly 70 includes a first link 71 and a second link 72. The first link 71 includes a first bar 711 and a second bar 712. One end of the first bar 711 and one end of the second bar 712 are pivotably disposed on the first casing 11 and the second casing 12 via the first shaft 30, respectively. Another end of the first bar 711 and another end of the second bar 712 are pivotably disposed on the movable component 20 via the second shaft 40. Two opposite sides of the second link 72 are pivotably disposed on the second casing 12 of the base component 10 and the movable component 20 via the third shaft 50 and the fourth shaft 60, respectively. The base component 10, the movable component 20, the first link 71 and the second link 72 together form a four-linkage mechanism.

Figure 2:
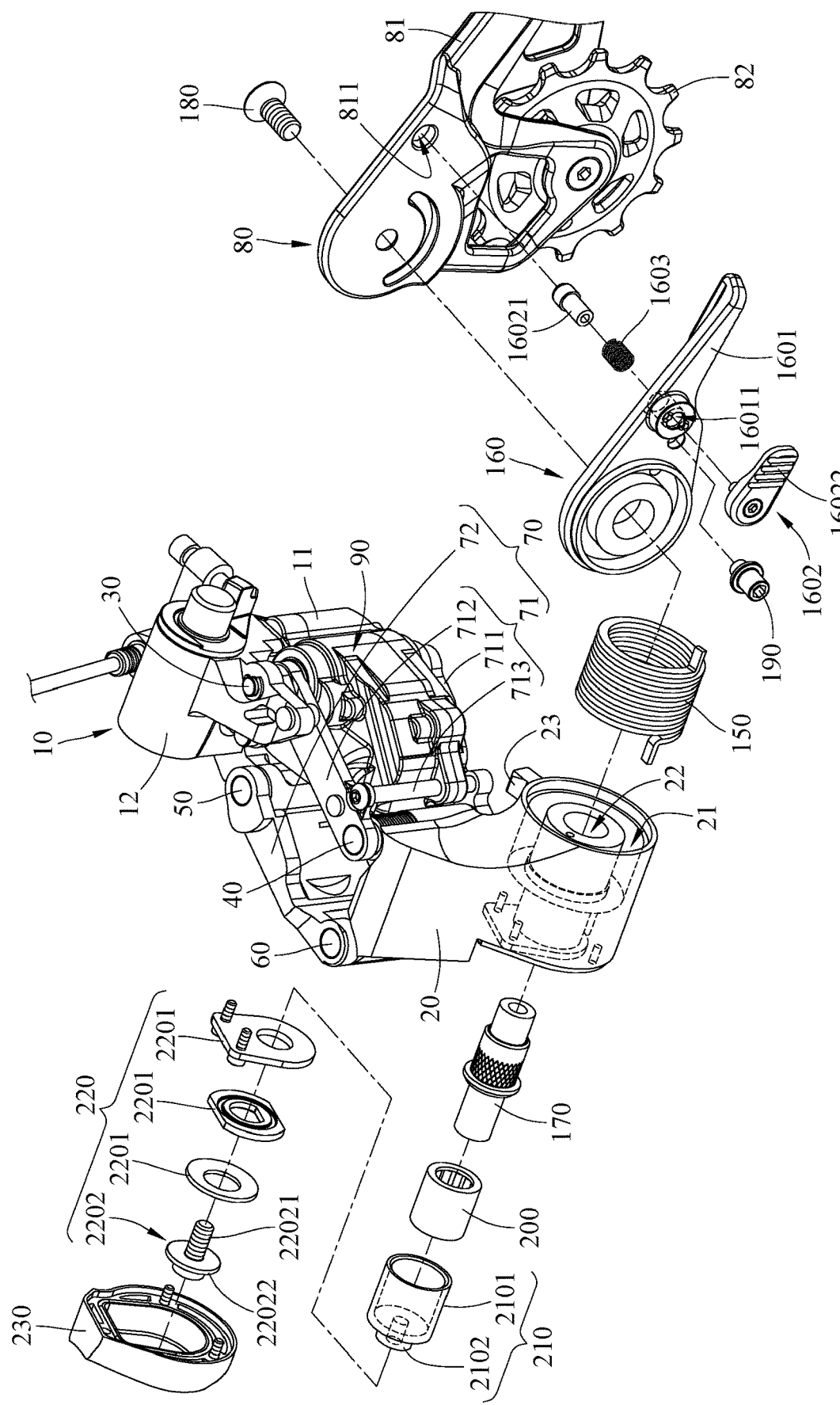
FIG. 2 is a partial exploded view of the bicycle rear derailleur in FIG. 1.
Figure 3:
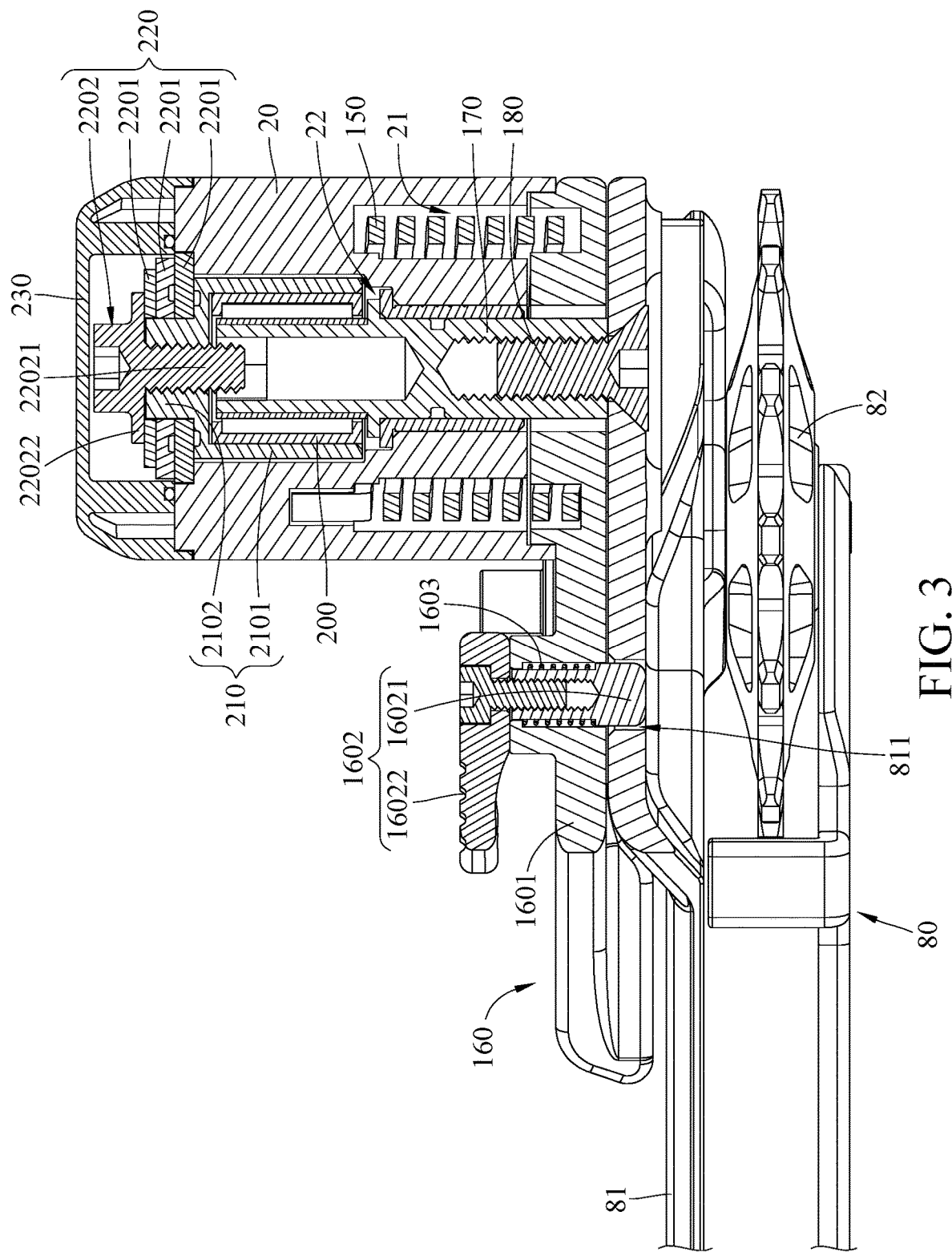
FIG. 3 is a partial cross-sectional view of the bicycle rear derailleur in FIG. 1.

Then, referring to FIGS. 2 and 3, FIG. 2 is a partial exploded view of the bicycle rear derailleur 1 in FIG. 1, and FIG. 3 is a partial cross-sectional view of the bicycle rear derailleur 1 in FIG. 1.

In this embodiment, the movable component 20 has an accommodation recess 21 and a through hole 22 surrounded by the accommodation recess 21. In addition, the bicycle rear derailleur 1 may further include a torsion spring 150, a torque control mechanism 160, a fifth shaft 170 and a fastener 180.

The torsion spring 150 is disposed in the accommodation recess 21 of the movable component 20, and one end of the torsion spring 150 is fixed to the movable component 20. The torque control mechanism 160 includes a torque transmission component 1601, a handle 1602 and a spring 1603. The torque transmission component 1601 is mounted on one end of the movable component 20, and another end of the torsion spring 150 is fixed to the torque transmission component 1601. The torque transmission component 1601 has a through hole 16011. The handle 1602 includes a pillar portion 16021 and an operating portion 16022 fixed to each other. The pillar portion 16021 is inserted into the through hole 16011 of the torque transmission component 1601, and the operating portion 16022 is located outside the through hole 16011 of the torque transmission component 1601. The spring 1603 is located in the through hole 16011 of the torque transmission component 1601, and the spring 1603 is configured to force one end of the pillar portion 16021 located farther away from the operating portion 16022 to stick out of the through hole 16011.

The chain guide 80 includes a frame 81, a guide pulley 82 and a tension pulley 83. The guide pulley 82 and the tension pulley 83 are rotatably disposed on the frame 81. The guide pulley 82 is configured to guide a bicycle chain (not shown), and the tension pulley 83 is configured to tension the bicycle chain. The frame 81 is staked on one side of the torque transmission component 1601 located farther away from the movable component 20. The fifth shaft 170 is disposed through the through hole 22 of the movable component 20 and the torque transmission component 1601, and the fastener 180 is disposed through the frame 81 of the chain guide 80 and is screwed into the fifth shaft 170, such that the chain guide 80 is pivotably disposed on the movable component 20. In this embodiment, the frame 81 has an insertion hole 811, and the insertion hole 811 is configured for the pillar portion 16021 of the handle 1602 to be inserted thereinto. When the handle 1602 is not operated, the spring 1603 constantly forces the pillar portion 16021 of the handle 1602 to insert into the insertion hole 811 of the frame 81. As a result, the torque applied by the spring 1603 can be transmitted to the chain guide 80 via the torque transmission component 1601 and the handle 1602, such that the tension pulley 83 of the chain guide 80 tensions the bicycle chain along a direction D1 (as shown in FIG. 1).

Figure 4:
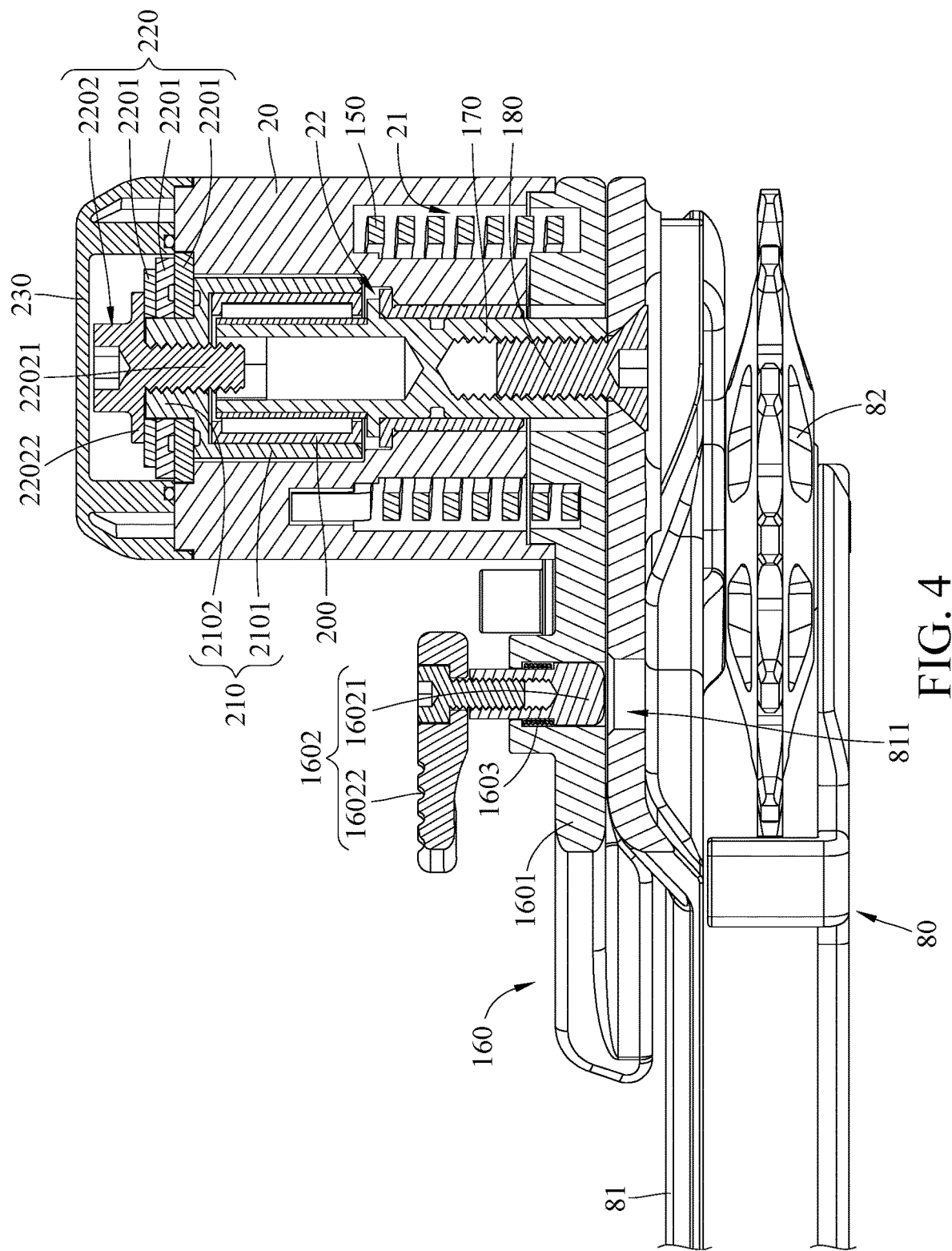
FIG. 4 is a partial cross-sectional view of the bicycle rear derailleur in FIG. 3 when a handle is operated.

Then, referring to FIG. 4, FIG. 4 is a partial cross-sectional view of the bicycle rear derailleur 1 in FIG. 3 when the handle 1602 is operated.

When a user desires to remove the bicycle rear derailleur 1 from the bicycle frame, the torque applied by the torsion spring 150 to the chain guide 80 is required to be released in advance. The user can operate the handle 1602 to detach the pillar portion 16021 of the handle 1602 from the insertion hole 811 of the frame 81 of the chain guide 80. As a result, the torque provided by the torsion spring 150 is merely transmitted to the torque transmission component 1601 but not to the chain guide 80, and thus the chain guide 80 no longer tensions the bicycle chain, thereby facilitating the removal of the bicycle rear derailleur 1 from the bicycle frame.

In this embodiment, the bicycle rear derailleur 1 may further include a positioning component 190. The positioning component 190 is fixed to the torque transmission component 1601. The movable component 20 may further have a positioning protrusion 23. After the pillar portion 16021 of the handle 1602 is detached from the insertion hole 811 of the frame 81 of the chain guide 80, the torsion spring 150 continues to apply torque to the torque transmission component 1601 so as to force the torque transmission component 1601 to rotate until the positioning component 190 contacts the positioning protrusion 23.

Note that the positioning component 190 and the positioning protrusion 23 of the movable component 20 are optional components and structures and may be omitted in some other embodiments. In addition, the torque control mechanism 160 is also an optional component and may be omitted in some other embodiments.

In this embodiment, the bicycle rear derailleur 1 may further include a one-way bearing 200, a bearing sleeve 210 and a resistance applying mechanism 220. The one-way bearing 200 is located in the through hole 22 of the movable component 20 and is sleeved on the fifth shaft 170. When the chain guide 80 is pivoted relative to the movable component 20 along the direction D1, the chain guide 80 drives the fifth shaft 170 to rotate relative to the one-way bearing 200. When the chain guide 80 is pivoted relative to the movable component 20 along a direction D2 opposite to the direction D1, the chain guide 80 rotates the one-way bearing 200 via the fifth shaft 170. The bearing sleeve 210 includes a sleeve portion 2101 and a protrusion portion 2102. The sleeve portion 2101 is located in the through hole 22 of the movable component 20 and is sleeved on the one-way bearing 200 via a tight fit manner; that is, the sleeve portion 2101 is firmly fixed to the one-way bearing 200. The protrusion portion 2102 axially protrudes from the sleeve portion 2101, and a width of the protrusion portion 2102 is smaller than a width of the sleeve portion 2101. The resistance applying mechanism 220 includes a plurality of friction pieces 2201 and an adjustment component 2202. The friction pieces 2201 are sleeved on the protrusion portion 2102 of the bearing sleeve 210, and one of the friction pieces 2201 located closest to the sleeve portion 2101 of the bearing sleeve 210 is in contact with the sleeve portion 2101. The adjustment component 2202 has a threaded portion 22021 and an outer flange 22022. The threaded portion 22021 of the adjustment component 2202 is screwed into the protrusion portion 2102 of the bearing sleeve 210, and the friction pieces 2201 are located between the outer flange 22022 of the adjustment component 2202 and the sleeve portion 2101. The adjustment component 2202 can be further screwed into the protrusion portion 2102 of the bearing sleeve 210 to force the outer flange 22022 of the adjustment component 2202 to increase friction between the friction pieces 2201 and the sleeve portion 2101 of the bearing sleeve 210 for resisting the bearing sleeve 210 from rotating relative to the movable component 20. As a result, the chain guide 80 is uneasy to pivot relative to the movable component 20 along the direction D2 for rotating the fifth shaft 170, the one-way bearing 200 and the bearing sleeve 210, thereby preventing the bicycle chain from being falling off from a sprocket. When the bicycle rear derailleur 1 is required to be removed from the bicycle frame, the adjustment component 2202 can be slightly screwed out of the protrusion portion 2102 for reducing the friction between the friction pieces 2201 and the sleeve portion 2101 of the bearing sleeve 210, thereby facilitating the removal of the bicycle rear derailleur 1 from the bicycle frame.

In this embodiment, the bicycle rear derailleur 1 may further include a cover 230. The cover 230 is mounted on the movable component 20 for covering the resistance applying mechanism 220.

Note that the one-way bearing 200, the bearing sleeve 210, the resistance applying mechanism 220 and the cover 230 are optional components and may be omitted in some other embodiments.

Figure 5:
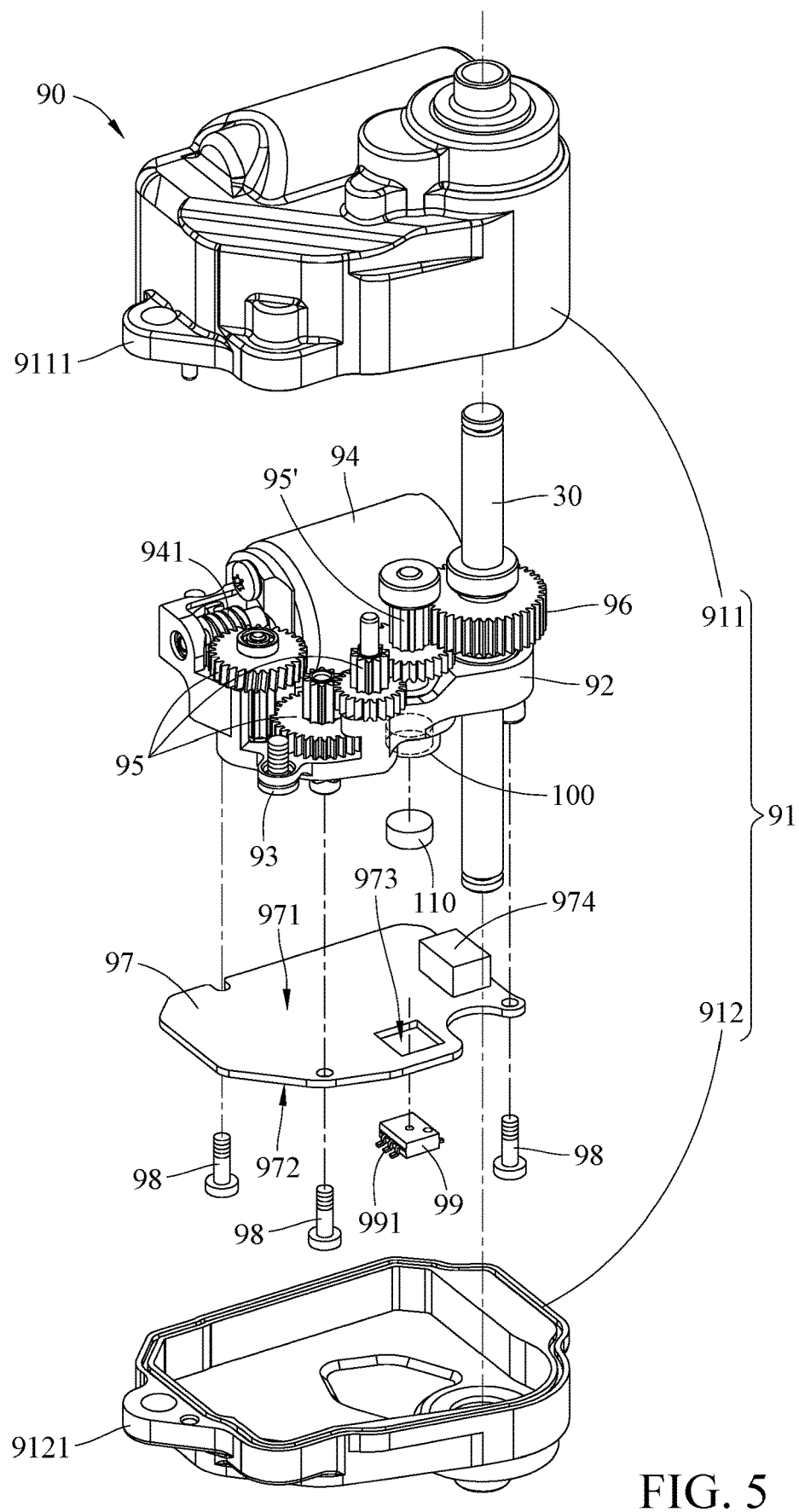
FIG. 5 is an exploded view of a driving assembly and a first shaft of the bicycle rear derailleur in FIG. 1.
Figure 6:
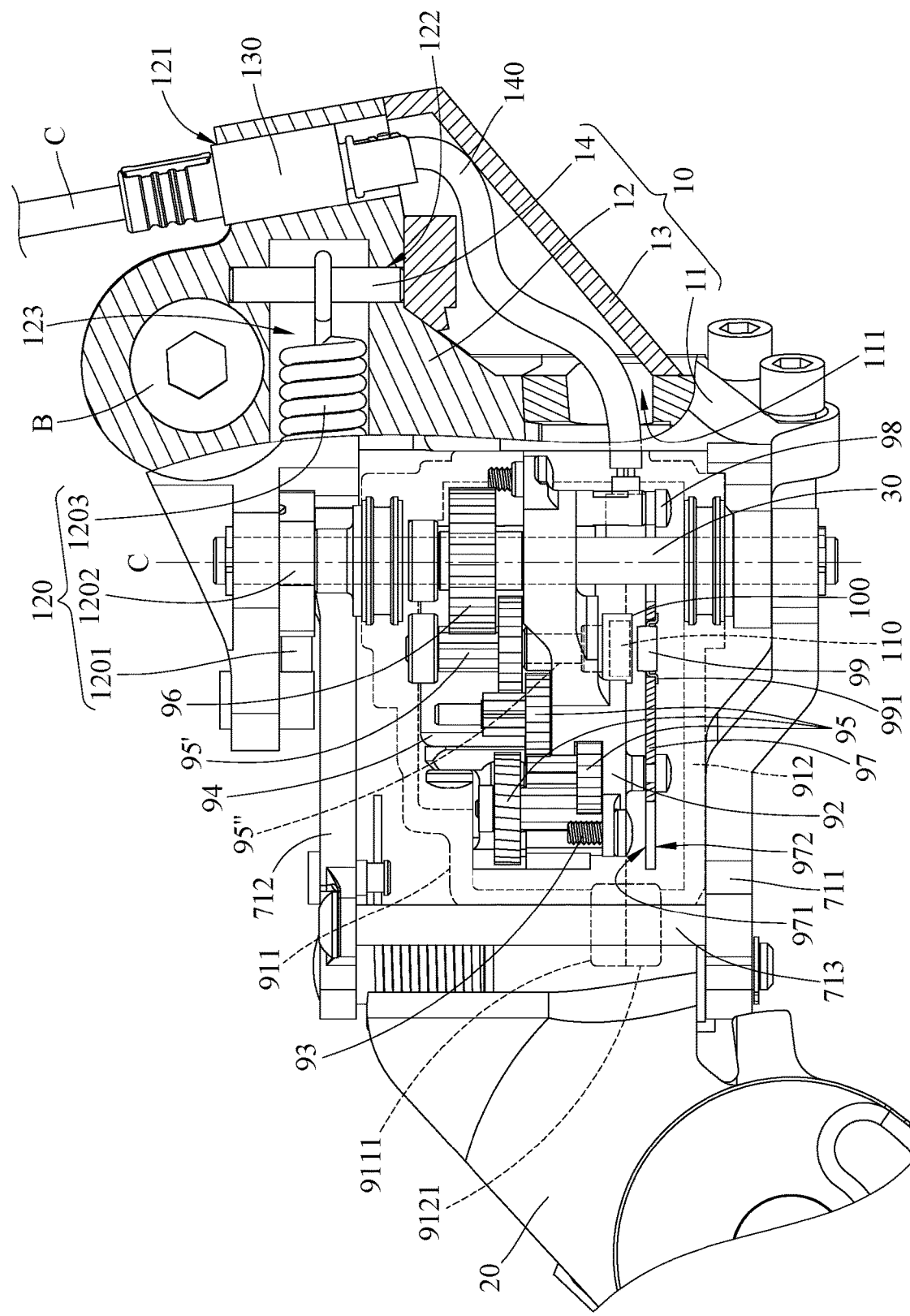
FIG. 6 is a partial cross-sectional view of the bicycle rear derailleur in FIG. 1.
Figure 7:
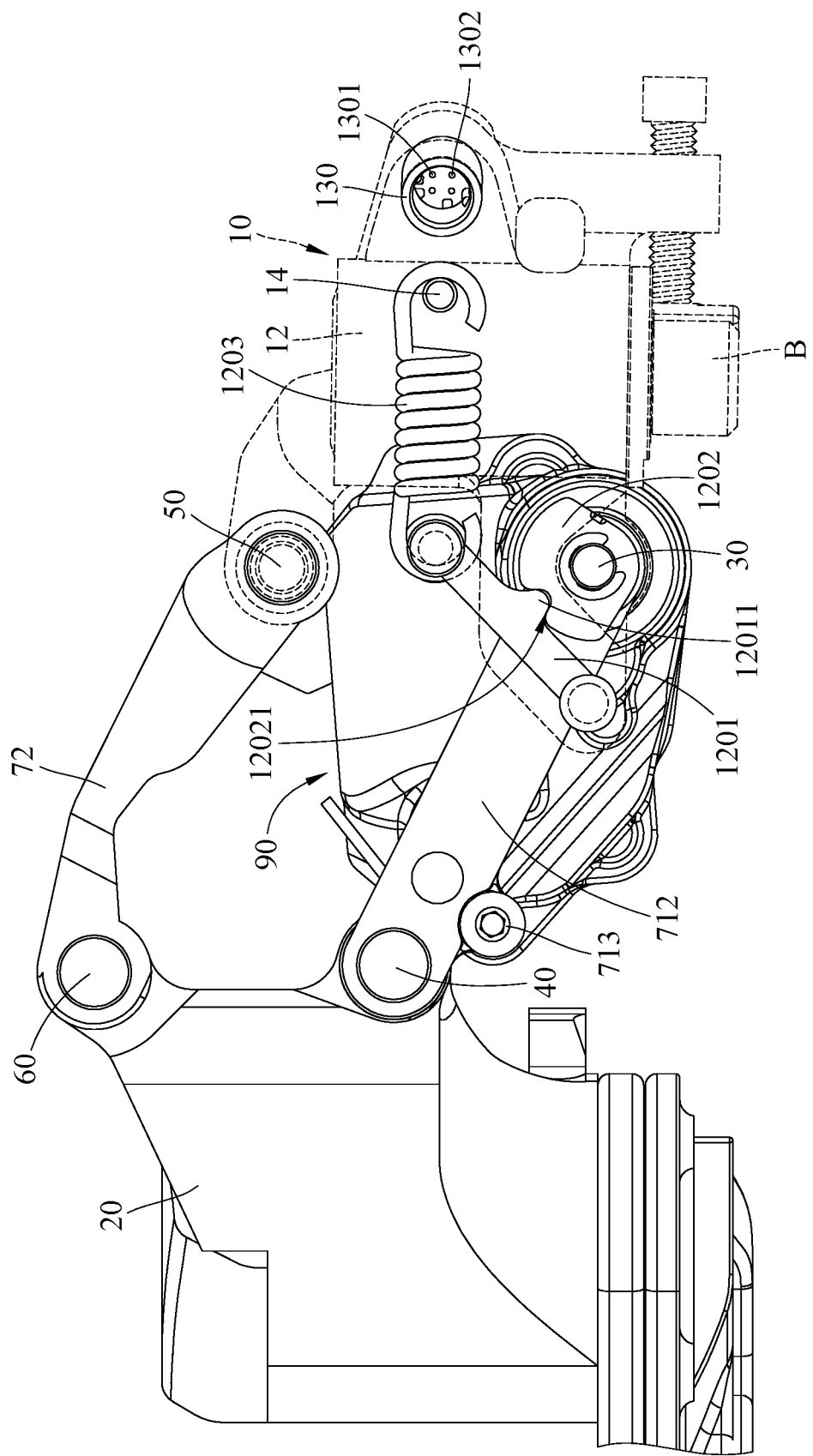
FIG. 7 is a partial top view of the bicycle rear derailleur in FIG. 1.

The driving assembly 90 is disposed between the first bar 711 and the second bar 712, and the first shaft 30 is disposed through the driving assembly 90. Specifically, referring to FIGS. 5 to 7, FIG. 5 is an exploded view of the driving assembly 90 and the first shaft 30 of the bicycle rear derailleur 1 in FIG. 1, FIG. 6 is a partial cross-sectional view of the bicycle rear derailleur 1 in FIG. 1, and FIG. 7 is a partial top view of the bicycle rear derailleur 1 in FIG. 1.

The driving assembly 90 includes a casing 91, a mount seat 92, a plurality of first fasteners 93, a motor 94, a plurality of transmission gears 95, an output gear 95', an output shaft 95", a connection gear 96, a circuit board 97, a plurality of second fasteners 98, a sensor 99, a support seat 100 and a sensing component 110.

The casing 91 includes a base 911 and a cover 912 assembled with each other. The base 911 has a tab portion 9111, and the cover 912 has a tab portion 9121. The first link 71 may further include a mount pillar 713. The mount pillar 713 is, for example, a bolt. The mount pillar 713 is disposed through the second bar 712, the tab portion 9111 of the base 911 and the tab portion 9121 of the cover 912 and is screwed into the first bar 711. In addition, the first shaft 30 is disposed through the base 911 and the cover 912 of the casing 91.

The mount seat 92 is located in the casing 91, and the first fasteners 93 fix the mount seat 92 to the base 911. Note that the first fasteners 93 are optional components and the mount seat 92 may be fixed to the base 911 of the casing 91 via other manners, such as adhering or snap-fit manner.

The motor 94 is fixed to the mount seat 92, and the motor 94 has an output shaft 941. The transmission gears 95 are rotatably disposed on the mount seat 92 and are connected to one another, and one of the transmission gears 95 is connected to the output shaft 941 of the motor 94.

The output gear 95' is rotatably disposed on the mount seat 92 and is connected to one of the transmission gears 95 located farthest from the motor 94. The output shaft 95" is disposed through the mount seat 92 and is fixed to the output gear 95', and the output shaft 95" is rotatable along with the output gear 95'.

The connection gear 96 is located in the casing 91 and is fixed to the first shaft 30. The connection gear 96 is connected to the output gear 95'. Accordingly, power output by the output shaft 941 of the motor 94 can be transmitted to the first shaft 30 via the transmission gears 95, the output gear 95' and the connection gear 96.

The second fasteners 98 are, for example, screws. The second fasteners 98 fix the circuit board 97 to the mount seat 92. Note that the second fasteners 98 are optional components, and the circuit board 97 may be fixed to the mount seat 92 via other manners, such as adhering or snap-fit manner.

The circuit board 97 is electrically connected to the motor 94, for example, via wires (not shown). The circuit board 97 has a first surface 971, a second surface 972 and a through hole 973. The first surface 971 faces the mount seat 92, the second surface 972 faces away from the first surface 971. Two opposite ends of the through hole 973 penetrate through the first surface 971 and the second surface 972, and the through hole 973 is aligned with the output gear 95'.

In this embodiment, the circuit board 97 may further have an electrical connector 974, and the electrical connector 974 is, for example, located on the first surface 971. The bicycle rear derailleur 1 may further include an electrical socket 130 and a cable 140, and the base component 10 may further include a cover 13. In addition, the first casing 11 has a cable hole 111, and the second casing 12 has an accommodation hole 121. The electrical socket 130 is disposed in the accommodation hole 121 of the second casing 12, and the cable 140 extends from inside to outside of the accommodation hole 121 of the second casing 12, and the cable 140 is disposed through the cable hole 111 of the first casing 11 and the base 911 of the casing 91, and the cable 140 is electrically connected to the electrical connector 974 and the electrical connector 974 of the circuit board 97 so as to be electrically connected to the motor 94 via the circuit board 97. The cover 13 is mounted on the first casing 11 and the second casing 12, and the cover 13 covers the cable 140.

The electrical socket 130 has a signal terminal 1301 and a power terminal 1302. The electrical socket 130 is configured for an external cable C to be detachably mounted thereto. The external cable C is, for example, connected to a shift control device (not shown). The shift control device can generate a shift signal, and the shift signal is transmitted to the circuit board 97 via the external cable C, the electrical socket 130 and the cable 140, such that the circuit board 97 activates the motor 94 to operate for the shift of the bicycle rear derailleur 1. In addition, a power of the shift control device can provide electricity to the bicycle rear derailleur 1 via the external cable C for the operation of the bicycle rear derailleur 1.

Note that the electrical connector 974 of the circuit board 97, the electrical socket 130, the cable 140 and the cover 13 of the base component 10 are optional components. In some other embodiments, the shift signal generated by the shift control device can be transmitted to the circuit board via wireless manner, and the electricity required by the bicycle rear derailleur may be provided by a battery in the bicycle rear derailleur.

The sensor 99 is, for example, a Hall sensor. The sensor 99 has a plurality of pins 991. The sensor 99 is partially located in the through hole 973 of the circuit board 97, and the sensor 99 sticks out of the first surface 971 of the circuit board 97, and the pins 991 of the sensor 99 are connected to the second surface 972 of the circuit board 97; that is, the first surface 971 and the second surface 972 of the circuit board 97 pass through the sensor 99.

The sensing component 110 is, for example, a magnet. The sensing component 110 is located in a path where the motor 94 transmits power to the first shaft 30. Specifically, the support seat 100 is fixed to the output shaft 95" so as to be rotatable with the output shaft 95". The sensing component 110 is disposed in the support seat 100. The sensor 99 is configured to measure a rotation of the sensing component 110 so as to indirectly obtain a rotation position of the output gear 95'. The circuit board 97 controls the motor 94 according to information measured by the sensor 99.

In this embodiment, the sensor 99 is partially located in the through hole 973 of the circuit board 97, and the first surface 971 and the second surface 972 of the circuit board 97 pass through the sensor 99, which allows an overall thickness of the circuit board 97 and the sensor 99 to be reduced as much as possible. Therefore, the space in the casing 91 for accommodating the circuit board 97 and the sensor 99 can be reduced, and thus the bicycle rear derailleur 1 is small in size and is aesthetic in appearance.

Note that the first surface 971 and the second surface 972 of the circuit board 97 are not restricted to both passing through the sensor 99; in some other embodiments, the first surface of the circuit board may pass through the sensor, but the second surface of the circuit board may not pass through the sensor; that is, the sensor merely sticks out of the first surface of the circuit board but not stick out of the second surface of the circuit board. In another embodiment, the second surface of the circuit board may pass through the sensor, but the first surface of the circuit board may not pass through the sensor; that is, the sensor merely sticks out of the second surface of the circuit board but not stick out of the first surface of the circuit board.

In addition, the sensor 99 is not restricted to being partially located in the through hole 973; in some other embodiments, the sensor may be entirely located in the through hole of the circuit board, and the pins of the sensor may be connected to an inner surface of the through hole. As a result, the overall thickness of the circuit board and the sensor equals to the thickness of the circuit board, and thus the space in the casing for accommodating the circuit board and the sensor can be further reduced, and the bicycle rear derailleur is smaller in size and is more aesthetic in appearance.

On other hand, the circuit board 97 is not restricted to having the through hole 973; in some other embodiments, the circuit board may not have the through hole, and the sensor may be disposed on a side surface of the circuit board connected to the first surface and the second surface.

Note that the support seat 100 is an optional component. In some other embodiments, the driving assembly may not include the support seat, and the sensing component may be directly fixed on the transmission gear.

On the other hand, the sensor 99 is not restricted to being a Hall sensor and may be modified to another type of a sensor which can measure the rotation position of the transmission gear, and the sensing component cooperated with the sensor may be modified according to the type of the sensor. When there is no need for the sensor to cooperate with the sensing component, the sensing component may be omitted. In addition, the sensor may be optional component and may be omitted.

In addition, the transmission gears 95, the output gear 95' and the connection gear 96 are optional components and may be modified to other components or structures to transmit power provided by the motor according to actual requirements, or the motor may directly provide power to the first shaft.

Moreover, the casing 91 and the mount seat 92 of the driving assembly 90 are optional components and may be adopted or omitted according to actual requirements.

The clutch mechanism 120 is movably disposed at a position where the first shaft 30 and the base component 10 are connected to each other. Specifically, the clutch mechanism 120 includes a movable arm 1201, a cam 1202 and an elastic component 1203. One end of the movable arm 1201 is pivotably disposed on the second casing 12 of the base component 10, and the movable arm 1201 has a first engagement structure 12011. The cam 1202 is fixed to the first shaft 30, and the cam 1202 has a second engagement structure 12021. The first engagement structure 12011 of the movable arm 1201 is a block, and the second engagement structure 12021 of the cam 1202 is a recess. The second engagement structure 12021 of the cam 1202 is detachably engaged with the first engagement structure 12011 of the movable arm 1201.

Note that the first engagement structure 12011 of the movable arm 1201 is not restricted to being the block, and the second engagement structure 12021 is not restricted to being the recess; in some other embodiments, the first engagement structure of the movable arm may be a recess, and the second engagement structure of the cam may be a block.

In this embodiment, the second casing 12 of the base component 10 has a first mount hole 122 and a second mount hole 123 communicating with each other. The first mount hole 122 and the second mount hole 123 extend along two different directions, respectively. In addition, the base component 10 may further include a mount post 14. The mount post 14 is mounted in the first mount hole 122. The elastic component 1203 is, for example, an extension spring. The elastic component 1203 is partially located in the second mount hole 123, and two opposite ends of the elastic component 1203 are respectively fixed to another end of the movable arm 1201 and the mount post 14. The elastic component 1203 is configured to force the movable arm 1201 to move towards the cam 1202 for keeping the first engagement structure 12011 of the movable arm 1201 engaging with the second engagement structure 12021 of the cam 1202 when there is no other force exerted on the movable arm 1201.

Note that the elastic component 1203 is not restricted to being the extension spring. In some other embodiments, the elastic component may be a torsion spring disposed on a position where the movable arm is pivotably connected to the second casing of the base component for forcing the movable arm to move towards the cam.

Figure 8:
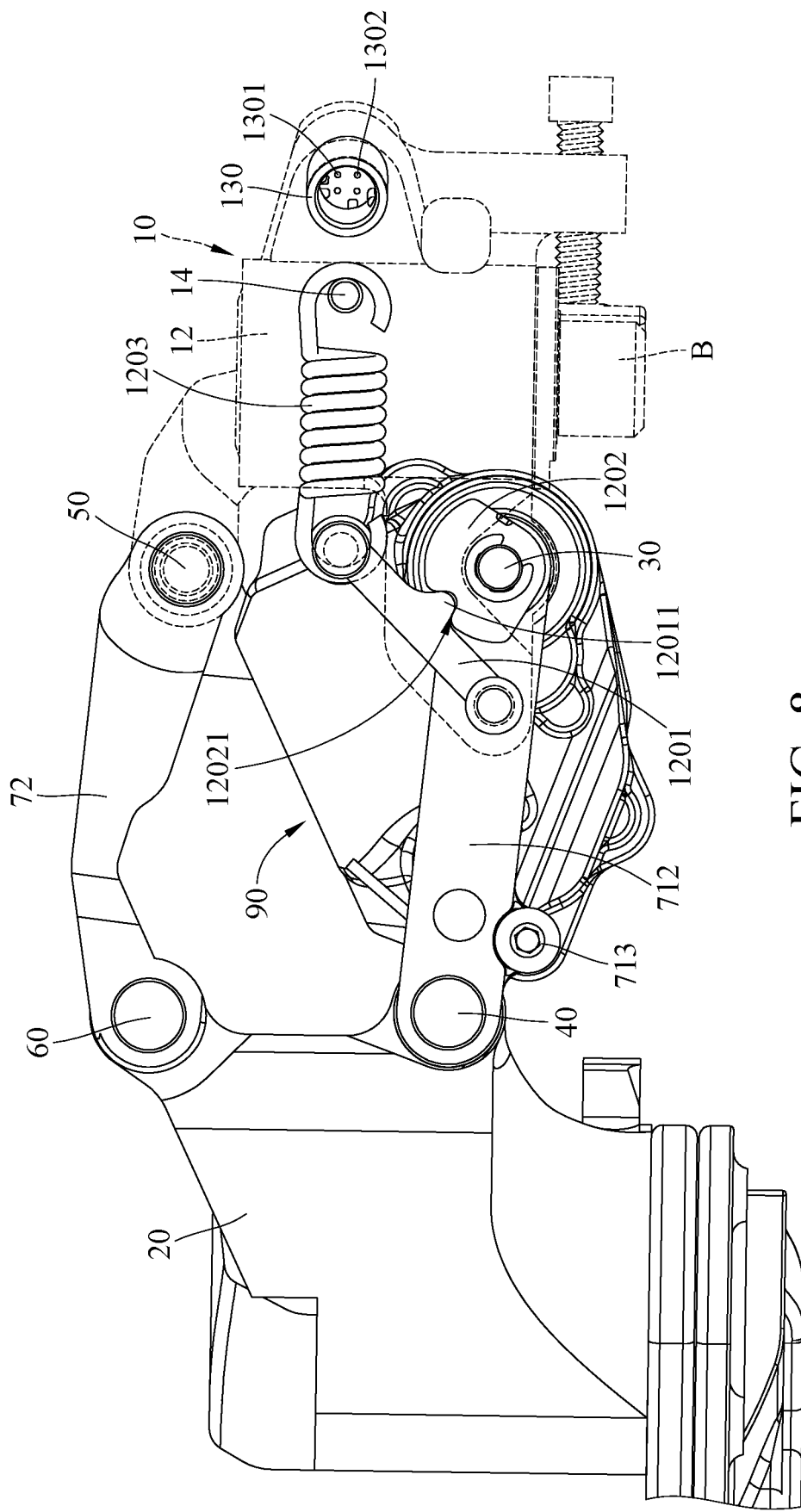
FIG. 8 is a partial top view of the bicycle rear derailleur in FIG. 1 when the bicycle rear derailleur is shift.

In this embodiment, the engagement between the movable arm 1201 and the cam 1202 of the clutch mechanism 120 can connect a transmission relationship between the first shaft 30 and the base component 10. Specifically, referring to FIGS. 6 and 8, FIG. 8 is a partial top view of the bicycle rear derailleur 1 in FIG. 1 when the bicycle rear derailleur 1 is shift.

After the circuit board 97 receives the shift signal transmitted by the shift control device, the circuit board 97 actuates the motor 94 to operate, and the power output by the motor 94 is transmitted to the first shaft 30 via the transmission gears 95, the output gear 95' and the connection gear 96. At this moment, the cam 1202 fixed to the first shaft 30 and the movable arm 1201 disposed on the base component 10 are engaged with each other, such that the power output by the motor 94 is transmitted to the base component 10 via the transmission gears 95, the output gear 95', the connection gear 96, the first shaft 30, the cam 1202 and the movable arm 1201. However, the base component 10 is mounted on the bicycle frame so as to be unable to move relative to the bicycle frame, and the base component 10, the movable arm 1201, the cam 1202 and the first shaft 30 are unable to move relative to one another, such that the output gear 95' connected to the connection gear 96 is moved about a central axis C of the first shaft 30, which drives the entire driving assembly 90 and the first bar 711 and the second bar 712 connected to the driving assembly 90 to pivot relative to the base component 10, thereby moving the movable component 20 and the chain guide 80 for moving the bicycle chain. As a result, the shift of the bicycle rear derailleur 1 is finished.

Figure 9:
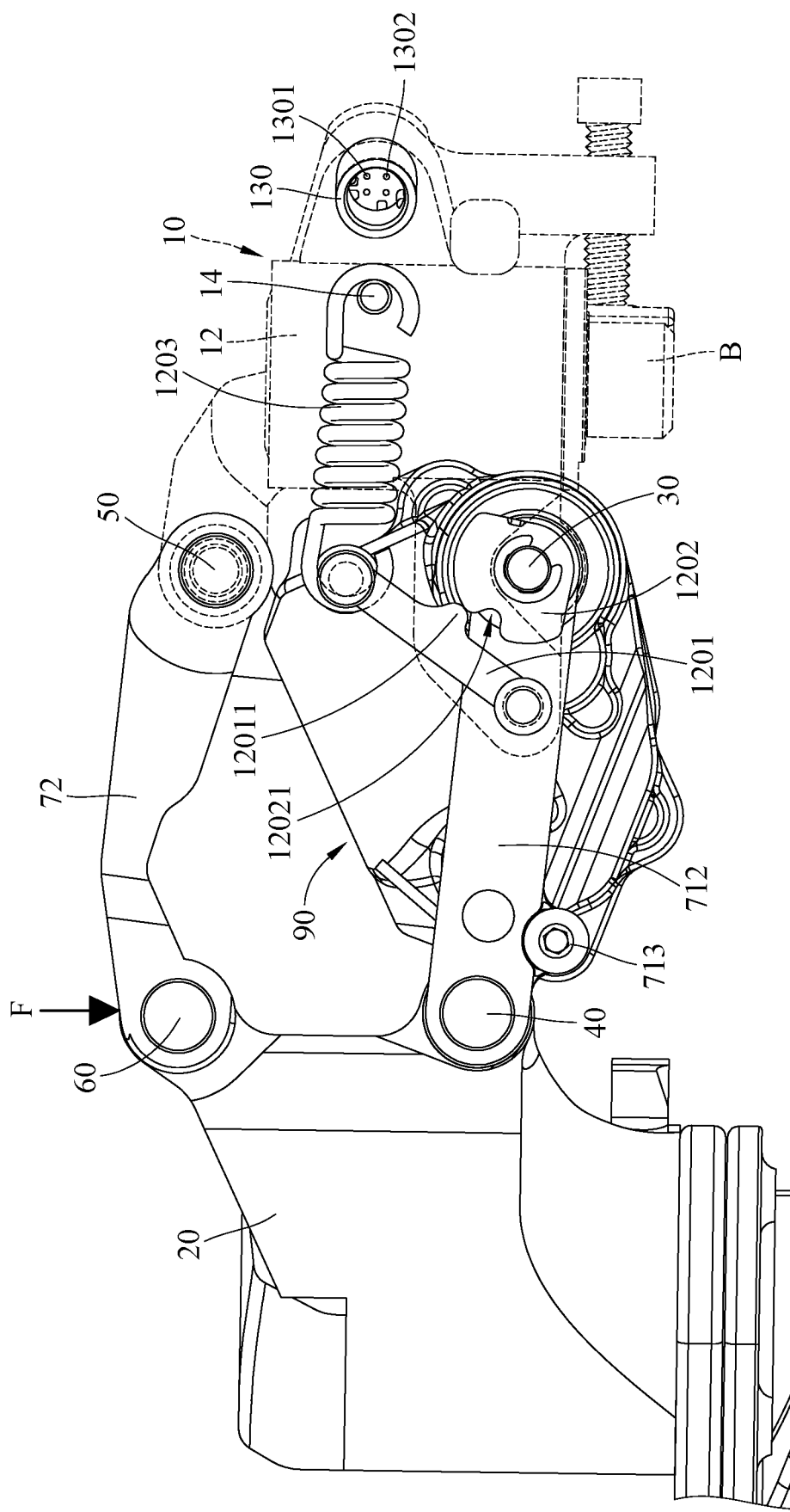
FIG. 9 is a partial top view of the bicycle rear derailleur in FIG. 1 when an external force is exerted on the bicycle rear derailleur.

Then, referring to FIGS. 6 and 9, FIG. 9 is a partial top view of the bicycle rear derailleur 1 in FIG. 1 when an external force is exerted on the bicycle rear derailleur 1.

During the operation of the motor 94, when there is an external force F (e.g., an impact) exerted on the bicycle rear derailleur 1, the movable arm 1201 and the cam 1202 of the clutch mechanism 120 disconnect the transmission relationship between the first shaft 30 and the base component 10. Specifically, the external force F forces the first bar 711 and the second bar 712 of the first link 71 to pivot relative to the base component 10 so as to pivot the entire driving assembly 90 connected to the first bar 711 and the second bar 712, such that the first shaft 30 and the cam 1202 fixed to the first shaft 30 rotate relative to the base component 10. During the rotation of the cam 1202, the cam 1202 pushes away the movable arm 1201 so as to disengage the engagement relationship between the cam 1202 and the movable arm 1201, such that the power output by the motor 94 after being transmitted to the cam 1202 will not be transmitted to the base component 10 via the movable arm 1201 and thus forces the cam 1202 to rotate relative to the movable arm 1201. As a result, the motor 94, the transmission gears 95, the output gear 95', the connection gear 96, the first shaft 30 and the cam 1202 would be in an idle rotation, which can protect the motor 94, the transmission gears 95, the output gear 95', the connection gear 96 and the first shaft 30 from being damaged by the external force F. Then, since the motor 94 keeps operating, the cam 1202 will rotate one full revolution for re-engaging the second engagement structure 12021 of the cam 1202 with the first engagement structure 12011 of the movable arm 1201, and thus the engagement between the cam 1202 and the movable arm 1201 restores the transmission relationship between the first shaft 30 and the base component 10.

In this embodiment, the clutch mechanism 120 connect and disconnect the transmission relationship between the first shaft and the base component 10 via the movable arm 1201 and the cam 1202, but the disclosure is not limited thereto. As long as the clutch mechanism is able to connect or disconnect the transmission relationship between the first shaft and the base component, the clutch mechanism may be any suitable configurations.

In this embodiment, the first casing 11 and the second casing 12 of the base component 10 are made of two pieces, but the disclosure is not limited thereto; in some other embodiments, the first casing and the second casing of the base component may be made of a single piece.

In addition, the first link 71 is not restricted to including the first bar 711, the second bar 712 and the mount pillar 713; in some other embodiments, the first link may be a casing, and the driving assembly may be accommodated in the casing.

Figure 10:
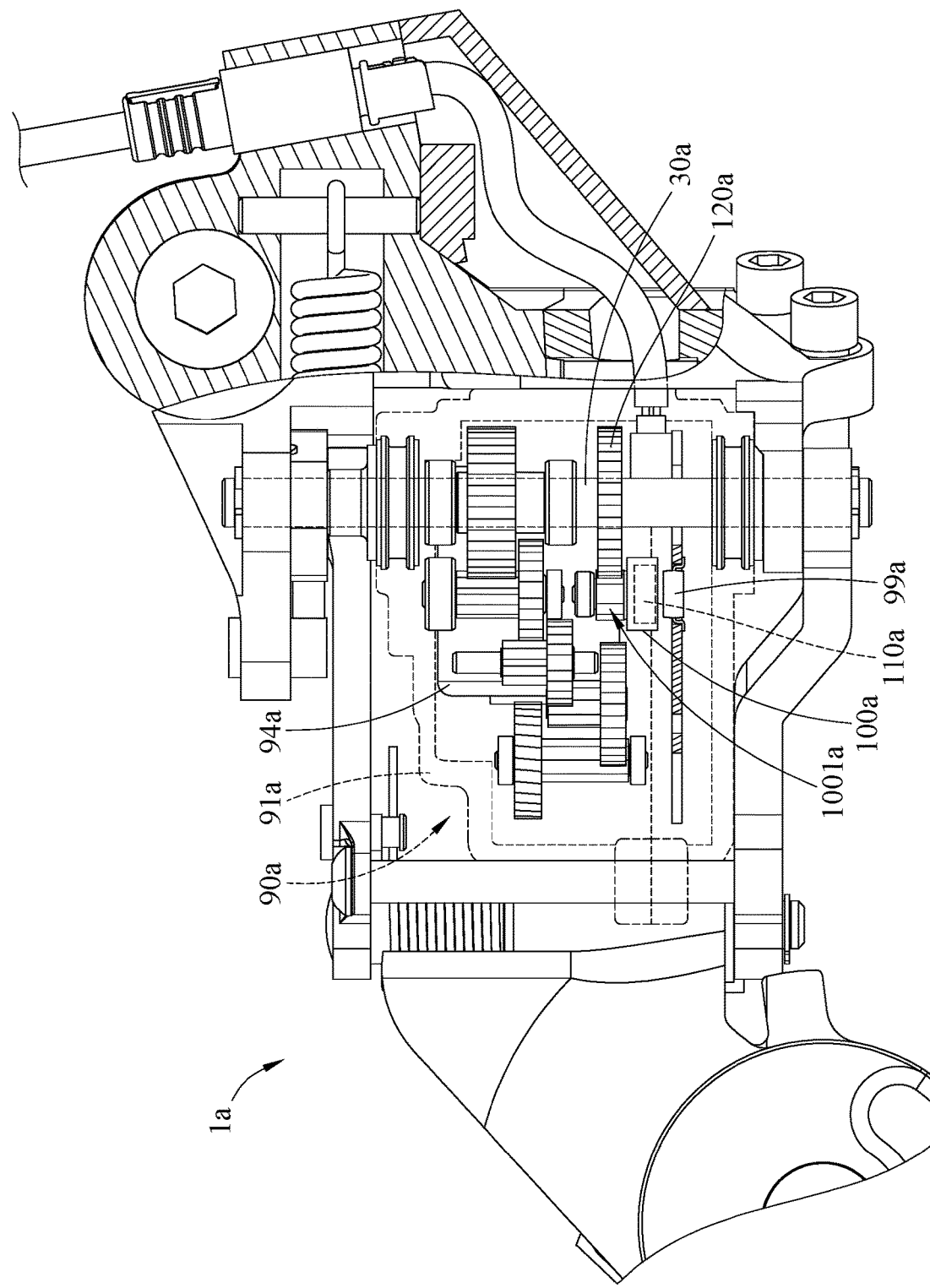
FIG. 10 is a partial cross-sectional view of a bicycle rear derailleur according to a second embodiment of the disclosure.

Then, referring to FIG. 10, FIG. 10 is a partial cross-sectional view of a bicycle rear derailleur 1a according to a second embodiment of the disclosure.

The bicycle rear derailleur 1a of this embodiment is similar to the bicycle rear derailleur 1 described above with reference to FIGS. 1 to 9, the difference between them is mainly in that a sensing component 110a of this embodiment is not located in a path where a motor 94a transmits power to the first shaft 30a. Therefore, the following paragraph mainly introduces the connection among the sensing component 110a and other components of this embodiment. As for other parts that are not explained in detail, please refer to the description of the bicycle rear derailleur 1 described above with reference to FIGS. 1 to 9 and will not be described hereinafter.

In this embodiment, a driving assembly 90a further includes another connection gear 120a, and the connection gear 120a is located in a casing 91a and fixed to a first shaft 30a. A support seat 100a supporting the sensing component 110a is rotatably disposed on the mount seat (not shown but can refer to the mount seat 92 in FIG. 6). The support seat 100a has a gear structure 1001a, the gear structure 1001a of the support seat 100a is meshed with the connection gear 120a. Therefore, during the operation of the motor 94a, the support seat 100a is rotated relative to the connection gear 120a so as to rotate the sensing component 110a for being measured by the sensor 99a.

According to the bicycle rear derailleurs as discussed in the above embodiments, the clutch mechanism is movably disposed at a position where the first shaft is connected to the base component, and the clutch mechanism can connect or disconnect the transmission relationship between the first shaft and the base component, which can prevent the driving assembly from being damaged by the external force (e.g., an impact) exerted on the bicycle rear derailleur, thereby maintaining the normal operation of the bicycle rear derailleur.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A bicycle rear derailleur, configured to be mounted on a bicycle frame, the bicycle rear derailleur comprising:
   a base component, configured to be mounted on the bicycle frame;
   a movable component;
   a first shaft, a second shaft, a third shaft and a fourth shaft;

a linkage assembly, comprising a first link and a second link, wherein two opposite sides of the first link are pivotably connected to the base component and the movable component via the first shaft and the second shaft, respectively, and two opposite sides of the second link are pivotably connected to the base component and the movable component via the third shaft and the fourth shaft, respectively;

a chain guide, pivotably disposed on the movable component;

a driving assembly, disposed on the first link, wherein the driving assembly is configured to drive the first shaft to rotate; and a clutch mechanism, movably disposed at a position where the first shaft is connected to the base component, wherein the clutch mechanism is configured to connect a transmission relationship between the first shaft and the base component or disconnect the transmission relationship between the first shaft and the base component.

2. The bicycle rear derailleur according to claim 1, wherein the clutch mechanism comprises a movable arm, a cam and an elastic component, the movable arm is pivotably disposed on the base component, the movable arm has a first engagement structure, the cam is fixed to the first shaft, the cam has a second engagement structure, the second engagement structure of the cam is detachably engaged with the first engagement structure of the movable arm, the elastic component is disposed on the movable arm, and the elastic component is configured to force the movable arm to move towards the cam.

3. The bicycle rear derailleur according to claim 2, wherein one end of the movable arm is pivotably disposed on the base component, the elastic component is an extension spring, and two opposite ends of the elastic component are respectively fixed to another end of the movable arm and the base component.

4. The bicycle rear derailleur according to claim 2, wherein the first engagement structure is a block, and the second engagement structure is a recess.

5. The bicycle rear derailleur according to claim 1, wherein the first link comprises a first bar and a second bar, one end of the first bar and one end of the second bar are pivotably disposed on the base component via the first shaft, another end of the first bar and another end of the second bar are pivotably disposed on the movable component via the second shaft, and the driving assembly are located between the first bar and the second bar.

6. The bicycle rear derailleur according to claim 5, wherein the first link further comprises a mount pillar, and the mount pillar is disposed through the second bar and the driving assembly and is screwed into the first bar.

7. The bicycle rear derailleur according to claim 1, wherein the driving assembly comprises a motor, a sensor and a sensing component, the motor is configured to drive the first shaft to rotate, the sensing component is located in a path where the motor transmits power to the first shaft, and the sensor is configured to measure a rotation of the sensing component.

8. The bicycle rear derailleur according to claim 7, wherein the driving assembly further comprises a plurality of transmission gears, an output gear, a connection gear and an output shaft, the motor is connected to the first shaft via the plurality of transmission gears, the output gear and the connection gear, sequentially, the output shaft is fixed to the output gear, and the sensing component is disposed on the output shaft.

9. The bicycle rear derailleur according to claim 1, wherein the driving assembly comprises a motor, a sensor and a sensing component, the motor is configured to drive the first shaft to rotate, the sensing component is not located in a path where the motor transmits power to the first shaft, and the sensor is configured to measure a rotation of the sensing component.

10. The bicycle rear derailleur according to claim 9, wherein the driving assembly further comprises a plurality of transmission gears, an output gear and two connection gears, the motor is connected to the first shaft via the plurality of transmission gears, the output gear and one of the two connection gears, sequentially, and the other of the two connection gears is connected to the first shaft and the sensing component.

11. The bicycle rear derailleur according to claim 1, further comprising an electrical socket and a cable, wherein the base component comprises a first casing and a second casing assembled with each other, the first link is pivotably disposed on the first casing and the second casing via the first shaft, the second link is pivotably disposed on the second casing via the third shaft, the first casing has a cable hole, the second casing has an accommodation hole, the electrical socket is disposed in the accommodation hole, the cable extends from inside to outside of the accommodation hole and penetrates through the cable hole, and the cable is electrically connected to the electrical socket and the driving assembly.

12. The bicycle rear derailleur according to claim 11, wherein the base component further comprises a cover, the cover is mounted on the first casing and the second casing, and the cover covers the cable.

13. A bicycle rear derailleur, configured to be mounted on a bicycle frame, the bicycle rear derailleur comprising:

a base component, configured to be mounted on the bicycle frame;

a movable component;

a first shaft, a second shaft, a third shaft and a fourth shaft;

a linkage assembly, comprising a first link and a second link, wherein two opposite sides of the first link are pivotably connected to the base component and the movable component via the first shaft and the second shaft, respectively, and two opposite sides of the second link are pivotably connected to the base component and the movable component via the third shaft and the fourth shaft, respectively;

a chain guide, pivotably disposed on the movable component; and a driving assembly, disposed on the first link and comprising a motor, a plurality of transmission gears, an output gear, a connection gear, an output shaft, a sensing component and a sensor, wherein the motor is connected to the first shaft via the plurality of transmission gears, the output gear and the connection gear, sequentially, the output shaft is fixed to the output gear, the sensing component is disposed on the output shaft, and the sensor is configured to measure a rotation of the sensing component.

* * * * *